June 28, 1949.  E. B. KELLY  2,474,676

METHOD OF FORMING ARTIFICIAL TEETH

Filed Feb. 27, 1946  2 Sheets-Sheet 1

Inventor
E. Byron Kelly.
by *The firm of Charles Hill*
Attys

June 28, 1949.  E. B. KELLY  2,474,676
METHOD OF FORMING ARTIFICIAL TEETH
Filed Feb. 27, 1946  2 Sheets-Sheet 2
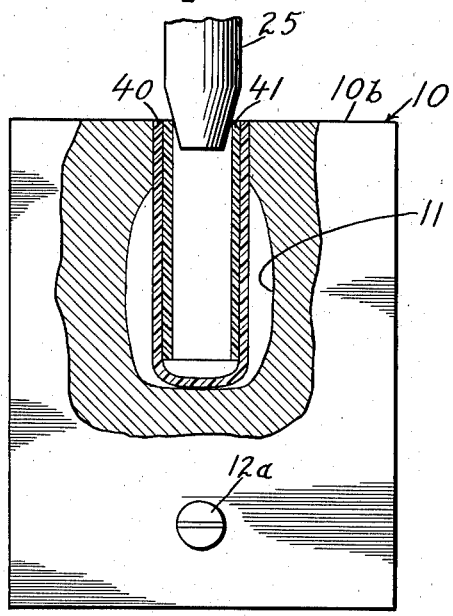
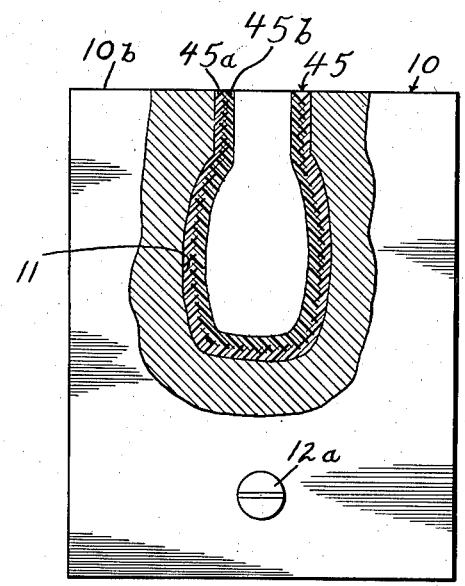
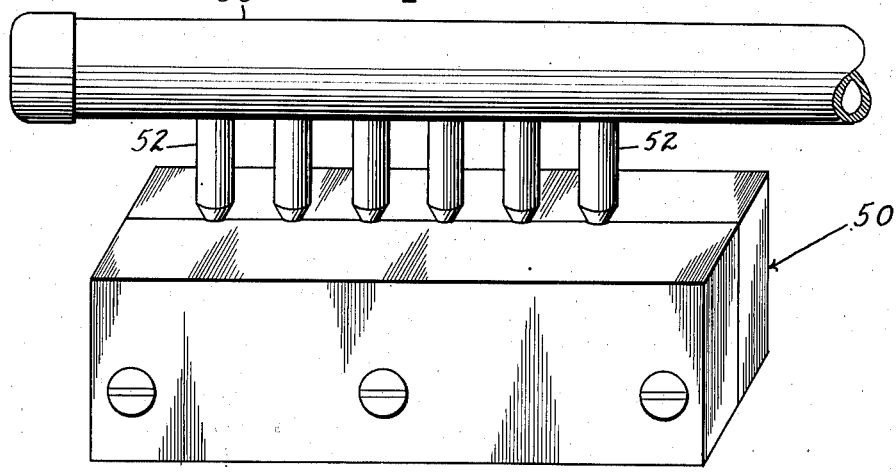
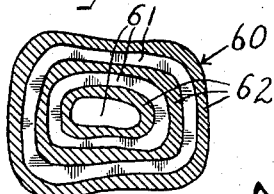
Inventor
E. Byron Kelly Patented June 28, 1949

2,474,676

UNITED STATES PATENT OFFICE 2,474,676

METHOD OF FORMING ARTIFICIAL TEETH

Ernest Byron Kelly, Chicago, Ill., assignor to Myerson Tooth Corporation, Cambridge, Mass., a corporation of Massachusetts Application February 27, 1946, Serial No. 650,573

6 Claims. (Cl. 18—55.1)

This invention relates to artificial teeth made of synthetic plastic material and to methods of preparing such teeth.

Heretofore either compression or injection molding methods have been employed in the manufacture of synthetic plastic teeth. A number of difficulties have been encountered in the practice of these conventional processes. Desirable color effects have been extremely difficult to obtain by the blending of materials of different shade, translucency or opacity. It has also been found difficult to effect proper distribution within the body of the teeth of relatively hard and relatively soft material. Further, control of "flash" (excess plastic waste) is very difficult, and air tends to be trapped in the mold with resultant defects in the teeth.

The above-mentioned disadvantages have been eliminated by the method of the present invention, which may be briefly described as follows. An ordinary split tooth mold may be used, formed with an aperture running parallel to the long axis of the tooth and connecting the root end of the tooth cavity with the outside of the mold between the split sections. The size of this aperture preferably corresponds to the diameter of the neck or cervical part of the tooth to be formed. Into such a mold I insert a tube made of suitable synthetic plastic resinous material. This tube has a diameter corresponding to the diameter of the above-mentioned aperture and is closed at one end to form a thimble, which is inserted into the mold with the closed end leading. This tube or thimble may thereafter be cut off flush with the outside of the mold. The plastic thimble or tube is next heated and expanded, as by mechanical means, by compressed air, by steam or by forcing plastic material or a pulverulent solid into the tube or thimble to conform the same with the inside of the mold after it has been rendered soft or plastic by the heating. The shell thus formed may be filled then and there with suitable plastic resinous material or may be removed from the mold and then filled with plastic resinous material.

In the practice of the above-described method, there is no necessity for establishing air or waste gates in the mold to eliminate air or to take care of excess plastic material. The air can escape between the opposed faces of the two halves of the mold. There is no excess plastic material to be taken care of. The outer surface of a tooth made as described presents a smooth polished outer surface free from surface defects and conforms exactly to the configuration of the inside of the mold cavity. Thus there is no need to cut away any "flash," and rough or dull mold parting lines are eliminated.

An extruded plastic tube may be used that is characterized by uniformity of physical properties. Such tubing is comparatively free from stresses and strains and from surface or internal defects. This feature by itself insures a superior product as compared to those obtained by other methods of manufacturing plastic teeth.

Two or more tubes may be used, rather than a single tube, and are preferably bonded together, as by suitable cementing compositions. Thus, a thermoplastic tube may be cemented to a thermosetting tube by means of a solution of the monomer of a thermoplastic resin. Color effects and light reflection can then be controlled with great exactness by combining tubes having different colors, different degrees of translucency, different degrees of thickness, as well as different wall thickness. Thus it is quite easy by the methods of the present invention to produce plastic teeth that simulate the appearance of natural teeth very closely.

By constructing the outer part of the teeth from one or more concentric tubes, the amount of plastic material necessary for forming the internal body or core is greatly reduced. Thus the density of the tooth can be increased and the commonly encountered defects due to gas bubbles and void spaces are practically eliminated.

By such molding of one or more concentric nested tubes of plastic material, it is possible to produce plastic teeth of remarkable toughness and strength. Further, the crazing and surface checking characteristic of conventional plastic teeth (believed to be due to tensioning effected following the application of solvents) is not encountered in plastic teeth formed by lamination according to the present invention.

It is therefore an important object of the present invention to provide a greatly improved method for manufacturing plastic teeth in which one or more concentric nested tubes of plastic material are expanded in softened condition within a mold into conformance with the inside of the mold, the residual interior space within the resulting shell also preferably being filled with plastic material.

Another important object of the present invention is to provide a new type of plastic tooth of laminated structure characterized by improved physical characteristics such as strength, resistance to checking and crazing, proper distribution of relatively hard and relatively soft materials within the tooth, and an appearance closely simulating natural teeth with respect to color, light reflection, translucency and the like.

Other and further objects and features of the present invention will become apparent from the following description and the appended claims. The appended drawings show, diagrammatically and by way of example, two methods of making plastic teeth in accordance with the present invention, as well as a tooth according to the present invention. More particularly:

Figure 5 is a view similar to Figure 2 but showing an assembly of two concentric nested tubes instead of the single tube of Figure 2;

Figure 6 is a view similar to Figure 5, but showing the plastic tubes immediately after the molding operation;

Figure 7 is a view similar to Figure 5 of a mold including a plurality of mold cavities; and Figure 8 is a bottom plan view of a molar tooth according to the present invention.

Figure 1:
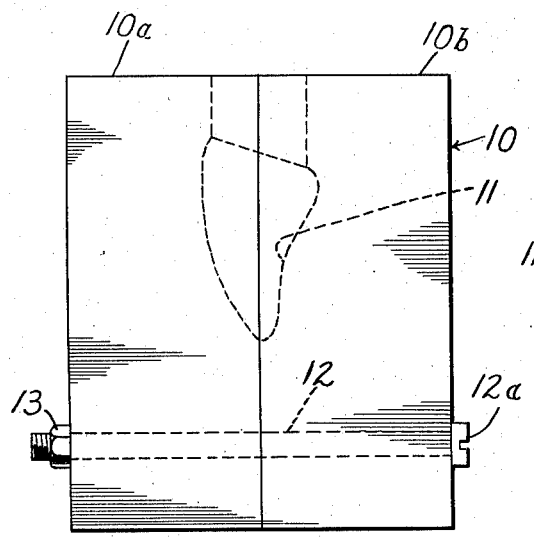
Figure 1 is a side elevation of a mold for making a plastic tooth in accordance with the method of the present invention.

The mold shown in Figures 1 to 6, inclusive, and indicated generally by the reference numeral 10 is made up of two complementary halves 10a and 10b that jointly define a mold cavity 11 open at the top of the mold. The lower part of this mold cavity 11 serves to form the tooth proper while the upper part serves to form the cervical or neck portion of the tooth. The two mold halves may be held together by means of a bolt 12 having a head 12a and a nut 13. If desired, other means may be employed for clamping the two mold halves together, for instance, any suitable frame.

Figure 2:
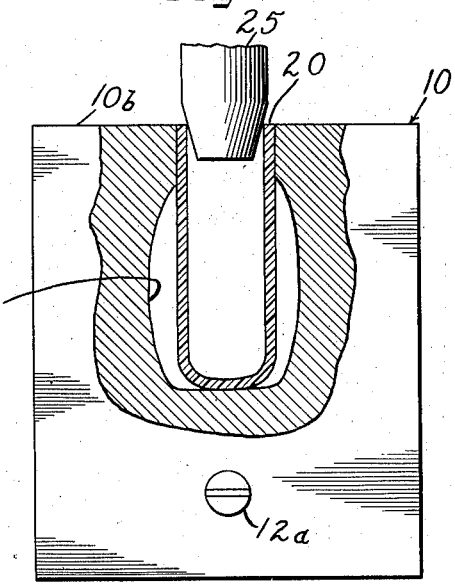
Figure 2 is a side elevational view, with parts shown in section, of the mold of Figure 1, with a plastic tube inserted therein for initiation of a molding operation.

For molding purposes, a tube 20 having a closed end is inserted into the mold cavity with its closed end leading (see Figure 2). The diameter of the tube should correspond to the diameter of the aperture forming the upper part of the mold cavity 11. The tube is then cut off flush with the outside of the mold. The tube 20 is made of thermoplastic or thermosetting resinous material (herein generically referred to as "plastic" or "plastic material"). If desired, the tube may be softened prior to insertion into the mold cavity so that the tube may be forced deeper into the mold cavity.

The molding operation comprises a heating of the plastic tube 20 to soften the same and an expansion of the tube so that the tube in its softened condition will be conformed to the inside wall of the mold cavity. Expansion may be effected by the use of a gaseous, liquid or other flowable medium forced into the interior of the tube 20 through a conduit 25 adapted to fit into the open end of the tube 20.

When compressed air is admitted through the tube 25 to expand the tube 20, it is advisable to heat the entire mold and plastic insert prior to the admission of the air. When steam is used for expanding the tube, the mold may be either hot or cold. I prefer to have the mold cold, since then the plastic tooth can immediately be removed from the mold after the molding operation is completed. Finer tooth detail and somewhat quicker operation can be effected by initial use of hot steam followed by cold compressed air.

Figure 3:
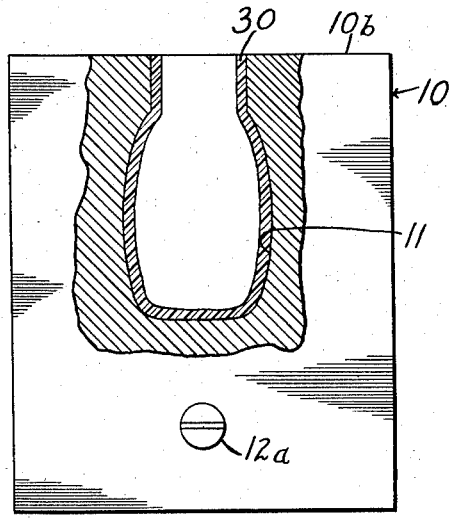
Figure 3 is a view similar to Figure 2 but showing the plastic tube after the molding operation.

By the use of hot steam, compressed air or other gaseous expansion medium, the tube 20 is formed into a shell 30 conforming to the inside walls of the mold cavity, as illustrated in Figure 3.

The shell 30 of Figure 3 may be filled with plastic material while still contained in the mold 10. For instance, a plastic mixture of a monomer with a polymer may be forced into the shell 30 and heat and pressure applied to polymerize the plastic mixture and form a finished tooth. Or a liquid monomer of a thermosetting or thermoplastic resin may be forced into the shell 20 and polymerized by the application of heat, light, pressure or other means to form a solid tooth.

If desired, hot plastic material such as a mixture of a monomer and a polymer of a thermosetting or thermoplastic resin may be used to soften and expand the tube 20 within the mold cavity 11 to form a complete plastic tooth in one operation.

Figure 4:
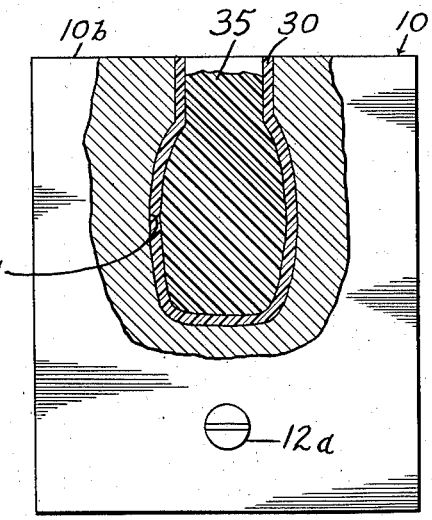
Figure 4 is a view similar to Figure 3, but showing the molded plastic tube filled with plastic material.

Figure 4 illustrates a complete plastic tooth as formed within the mold 10 either by initial expansion of a thimble-shaped blank by a gaseous or other medium under pressure followed by a filling of the thus formed shell with resinous material or else by the one step operation described in the preceding paragraph. The core of resinous material is indicated generally by the reference numeral 35.

For securing better simulation of natural teeth with respect to color, light reflection and translucency, I prefer to employ a plurality of tubular inserts nested together, as shown in Figure 5. There a mold similar in all respects to the mold of Figures 1 to 4 is shown together with an outer thimble-shaped insert 40 having nested therein a second tubular insert 41 (open at both ends). These two inserts 40 and 41 may be made of thermosetting or thermoplastic resinous material differing with respect to thickness, color, translucency, and index of refraction, whereby closer simulation of natural teeth may be effected. When, as illustrated, two or more tubular inserts are employed, the molding technique is the same as that described hereinabove. However, the tubular inserts, on being molded, are blended together, so as to form a single unitary or integral shell 45 made of two layers 45a and 45b, as illustrated in Figure 6. A core for this shell may be provided at the time the shell is formed by expansion of the nested tubular blanks 40 and 41, or else after the shell 45 has been formed.

For facilitating large scale production, a plurality of mold cavities may be provided, as shown in Figure 7, where such a mold is generally indicated by the reference numeral 50. This mold is in every respect similar to the molds of Figures 1 to 6 except for the provision of a number of mold cavities and a number of pipes 52 supplying the expansion medium from a common manifold or duct 53.

The tubular insert may be fashioned from polymerized thermoplastic resinous material such as methyl methacrylate, styrene, allyl acrylate, allyl esters, glycol dimethacrylate, or any other suitable thermoplastic or moldable thermosetting resin, including resins of the phenol-aldehyde type and various copolymerizing materials such as mixed methyl methacrylate and allyl esters.

If desired, the tubular insert may be made of incompletely polymerized thermosetting resinous material. A plurality of nested tubes may be cemented or bonded together, for instance, by using a solution of monomeric methylmethacrylate in acetone or carbon tetrachloride. Such solvents are particularly effective to bond thermoplastic resins to thermosetting resins, being capable of softening both types of resins. The core within the outer shell formed by expansion may be made up of monomeric or mixed monomeric-polymeric plastic material of thermosetting or thermoplastic nature. For completing the polymerization of the core material, high frequency short wave diathermy has been found to give excellent results, especially in processing allyl methacrylate or monomers containing fillers such as fiber glass, glass wool, or the like.

In the manufacture of plastic teeth the outer portion of a tooth has been made harder than the body structure, to simulate a natural tooth. I have found that certain other favorable results may be secured by making a plastic tooth with a relatively hard center or core surrounded by a relatively softer shell. For instance, if the outer coating is made up of a hard thermosetting resin and extends to the cervical or root end of the tooth, it is quite difficult to unite the tooth to a denture base composed of a thermoplastic resin of a type commonly employed by the dental profession for this purpose. On the other hand, a thermoplastic outer shell can be integrally united with a like base and would be firmly held by the denture. Further, the life of a plastic tooth subjected to mastication is found to be satisfactory when the plastic tooth is made up of a relatively hard core or center and of an outer covering shell made up of a somewhat softer plastic. Particularly good results are obtained when the outer shell is made up of a thermoplastic resin reinforced by a mineral filler such as fiber glass for increasing its hardness.

By the methods of the present invention it is possible to prepare a plastic tooth of novel structure and distinguished by exceptionally desirable characteristics. This novel plastic tooth comprises a series of laminated concentric or nested tubular portions arranged along the perpendicular axis of the tooth as well as a central core and includes alternating relatively hard and relatively soft laminations integrally bonded together. Thus, teeth may be prepared by molding, as described hereinabove, a plurality of nested tubes, the outermost tube only having a closed bottom. A suitable core is provided as described hereinabove. The layers of material composing this tooth are alternately hard and soft. The softer layers may be thinner than the hard layers. The finished tooth is either ground down over its occlusal surface, or else the outermost layer is made relatively thin or soft, so that the occlusal surface will be worn down in use to expose the ends of the various laminations. Such a tooth is illustrated in Figure 8 and is there indicated generally by the reference numeral 60. Relatively hard material is shown at 61, relatively soft material at 62. When such a tooth is worn, mastication with consequent abrasion will effect the formation of irregular surface depressions due to variations in surface hardness. If desired, a fiber glass filler or the like may be included with the plastic material forming the outermost lamination.

It will thus be apparent that I have provided a new method of forming plastic teeth by expansively molding and shaping the closed end of a piece of plastic tubing which may have additional tubes nested therein. In particular, a gaseous medium may be employed to expand the plastic tube or tubes when softened by heating, to form an outer shell for a finished tooth obtained by filling the interior of the shell with suitable material. The color and hardness characteristics of the tooth may be varied as desired by employing resinous materials of different color, light transmitting and reflecting and hardness characteristics for the tube or tubes and the central core. Many details of composition, structure and method may be varied within a wide range without departing from the principles of this invention, and it is, therefore, not my purpose to limit the patent granted on this invention otherwise than necessitated by the scope of the appended claims.

I claim as my invention:

1. A method of forming a plastic tooth, which comprises providing a thimble-shaped blank of plastic resinous material, nesting within said blank a tubular blank of plastic resinous material, providing a layer of cementing material between the nested blanks, inserting the nested blank assembly into a mold cavity, admitting a gaseous medium under pressure into said blank assembly to expand the same to form a shell conforming with the shape and dimensions of said mold cavity, and filling the resulting shell with resinous material.

2. The method of forming a plastic tooth which comprises providing a thimble-shaped blank of plastic resinous material, nesting a tubular blank of plastic resinous material within said thimble-shaped blank, bonding said blanks together, inserting the resulting blank assembly into a mold cavity, heating the blank assembly to soften the same, admitting a gaseous medium under pressure into said blank assembly to expand the same into conformity with the shape and dimensions of the mold cavity, filling the resulting shell with material including a resin-forming monomer, and polymerizing said monomer.

3. The method of forming a plastic tooth which comprises providing a thimble-shaped blank of plastic resinous material, nesting within said blank a plurality of tubular blanks of plastic material to form laminations including layers of varying hardness and color characteristics, inserting the blank assembly into a mold cavity, heating the blank assembly to soften the same, admitting a gaseous medium under pressure into the blank assembly to expand the same into conformity with the shape and dimensions of the mold cavity, filling the resulting shell with resin-forming material, and transforming said filling material into resinous material.

4. The method of forming a plastic tooth which comprises providing a thimble-shaped blank of plastic resinous material, inserting said blank into a mold cavity, heating said blank to soften the same, admitting a gaseous medium under pressure into said blank to expand the same against the walls of the mold cavity to form a hollow sheath defining the entire exposed surface of the finished tooth, filling the resulting sheath with resinous material, polymerizing said resinous material and removing the completed tooth from the mold.

5. A method of forming a plastic tooth which comprises providing a thimble-shaped blank of thermoplastic resinous material, inserting said blank into the mold cavity, admitting steam under pressure into said blank to expand the same against the walls of the mold cavity to form a hollow sheath defining the entire exposed surface of the finished tooth, filling the resulting sheath with resinous material, polymerizing said resinous material and removing the completed tooth from the mold.

6. A method of forming a plastic tooth which comprises providing a thimble-shaped blank of thermosetting resinous material, inserting said blank into a mold cavity, admitting steam under pressure into said blank to expand the same against the walls of the mold cavity to form a hollow sheath defining the entire exposed surface of the finished tooth, filling the resulting tooth with resinous material, polymerizing said resinous material and removing the completed tooth from the mold.

ERNEST BYRON KELLY.

REFERENCES CITED

The following references are of record in the file of this patent:

UNITED STATES PATENTS

| Number | Name | Date |
|---|---|---|
| 1,504,547 | Egerton | Aug. 12, 1924 |
| 2,082,715 | Nadai | June 1, 1937 |
| 2,317,763 | Hall | Apr. 27, 1943 |
| 2,380,468 | Saffir | July 31, 1945 |
| 2,391,106 | Saffir | Dec. 18, 1945 |
| 2,409,783 | Moskey | Oct. 23, 1946 |
| 2,410,936 | Gronemeyer | Nov. 12, 1946 |

FOREIGN PATENTS

| Number | Country | Date |
|---|---|---|
| 787,318 | France | 1935 |